(No Model.)

W. M. WHITING.
METHOD OF AND IMPLEMENT FOR UNITING THE ENDS OF BELTING.

No. 256,525. Patented Apr. 18, 1882.

WITNESSES:
C. Neveux
C. Sedgwick

INVENTOR:
W. M. Whiting
BY Munn & Co.
ATTORNEYS.

UNITED STATES PATENT OFFICE.

WILLIAM M. WHITING, OF ELIZABETH, NEW JERSEY, ASSIGNOR TO THE WHITING STRONGHOLD BELT CLASP COMPANY, OF NEW YORK, N. Y.

METHOD OF AND IMPLEMENT FOR UNITING THE ENDS OF BELTING.

SPECIFICATION forming part of Letters Patent No. 256,525, dated April 18, 1882.

Application filed July 15, 1881. (No model.)

*To all whom it may concern:*

Be it known that I, WILLIAM M. WHITING, of Elizabeth, in the county of Union and State of New Jersey, have invented a new and Improved Method of and Implement for Uniting the Ends of Belts, of which the following is a specification.

My invention relates to an improved implement for and method of preparing and uniting the ends of round leather machinery-belts by means of the internally-threaded ferrule or clasp in common use for that purpose.

Figure 1:
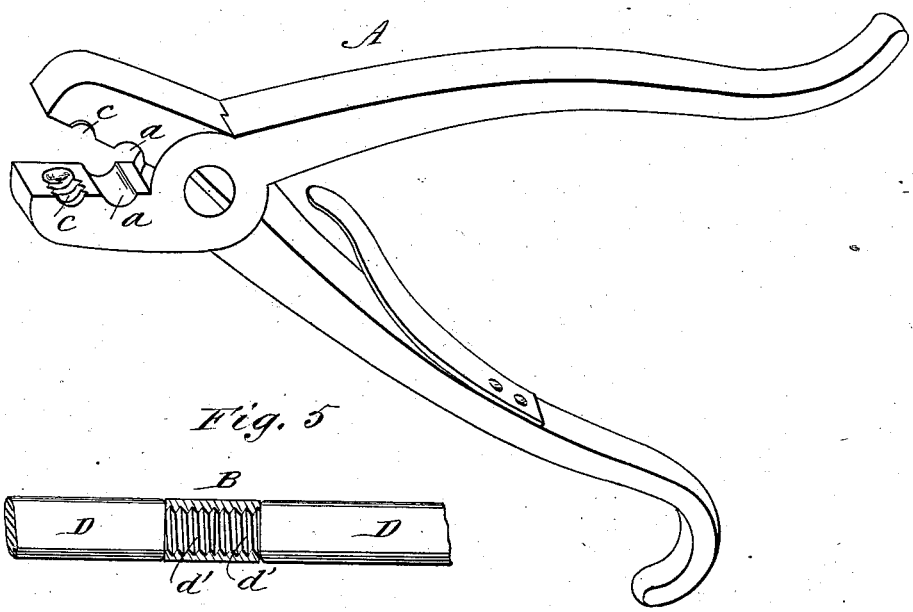
Figure 5:
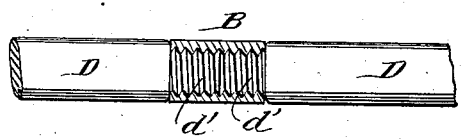
Figure 2:
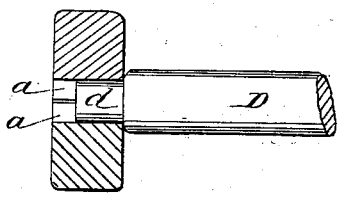
Figure 3:
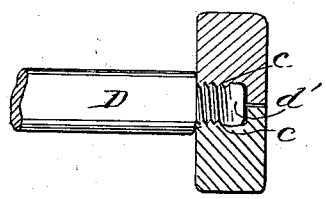
Figure 4:
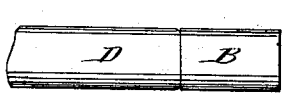
Figure 4:

In the accompanying drawings, Figure 1 is a perspective view of my improved implement for preparing the ends of the belts. Fig. 2 is a view of one end of a belt, showing the implement in section applied for compressing and solidifying the material of the belt. Fig. 3 is a view of the belt, showing the implement in section applied for threading the compressed and solidified end of the belt. Fig. 4 is a view of the belt with the ferrule or clasp placed upon one end of the belt, the other end being ready for insertion into the clasp; and Fig. 5 is a view of the ends of the belt when united by the clasp, the clasp being shown in section.

Similar letters of reference indicate corresponding parts.

The internally-threaded ferrules or clasps used for joining the ends of round belts must always be of about the same external diameter as that of the belt, not larger, otherwise a smooth joint could not be made; and in order to secure a sufficient depth of thread upon the inside of the clasp to hold the ends of the belt firmly the thickness of the metal of the clasp must be considerable, thus making the internal diameter of the clasp less than the diameter of the belt. In order that the ends of the belt may be made to enter the clasp for joining the belt, it has heretofore been the practice to trim the ends with a knife, which, besides being a troublesome job, leaves the end of the belt soft and spongy, so that when screwed into the clasp the fastening lacks firmness and the belt soon separates from the clasp. By my invention these difficulties are overcome, and a strong durable joint can be invariably made.

Instead of trimming the ends of the belt, as heretofore, I provide the pincher-like implement A, in the faces of the jaws of which are formed the concave recesses *a a*, in which recesses I reduce and solidify the material of the belt by repeated squeezings and compressions of the jaws upon the belt, the belt being partially rotated between each two compressions.

In front of the concave recesses *a a* in the face of the jaws I form the shorter threaded concave recesses *c c*. These recesses *c c* are of a length equal to about one-half the length of the clasp to be used, and of such depth in the jaws that when the jaws are closed they will form a chamber of a diameter about equal to the internal diameter of the clasp; and in and by these threaded recesses *c c*, after the ends of the belt have been reduced in size and solidified, as shown at *d* in the drawings, I form a thread upon the solidified portions, as shown at *d'*, by repeated compressions of the jaws of the implement upon the belt, the belt to be revolved at each compression. When the end of the belt is finished it will present the appearance shown at D in Fig. 4, the threaded portion *d'* being of just the right size and length to enter the clasp B and meet the opposite end of the belt in the center of the clasp, as shown in Fig. 5. After the clasp has been screwed to place upon one end of the belt, as shown in Fig. 4, in order that the belt shall not be twisted when the other end thereof shall have been screwed into the clasp it is necessary to give one end of the belt as many reverse turns or twists as there are complete threads upon it, so that the screwing of the other end of the belt into the clasp will untwist the belt again and leave it straight.

Having thus described my invention, I claim as new and desire to secure by Letters Patent—

1. The method herein described of preparing the ends of leather belts for insertion within screw-threaded metal clasps for joining the same, consisting in first compressing and solidifying the material of the belt at the ends by a compressing-instrument and then forming a screw-thread upon the compressed and solidified portions, substantially as described.

2. As a means of solidifying and treating the ends of belts for joining the same by a clasp, an implement constructed, substantially as described, in the form of pinchers, the faces of the jaws of which are formed with corresponding threaded recesses, $c$, as shown and described.

WM. M. WHITING.

Witnesses:
C. SEDGWICK,
J. H. SCARBOROUGH.